April 10, 1956  J. SHIBUYA  2,741,052
MECHANICAL FISHING APPARATUS
Filed Oct. 17, 1950  4 Sheets-Sheet 2

INVENTOR
JUDO SHIBUYA

BY Cushman, Darby & Cushman
ATTORNEY

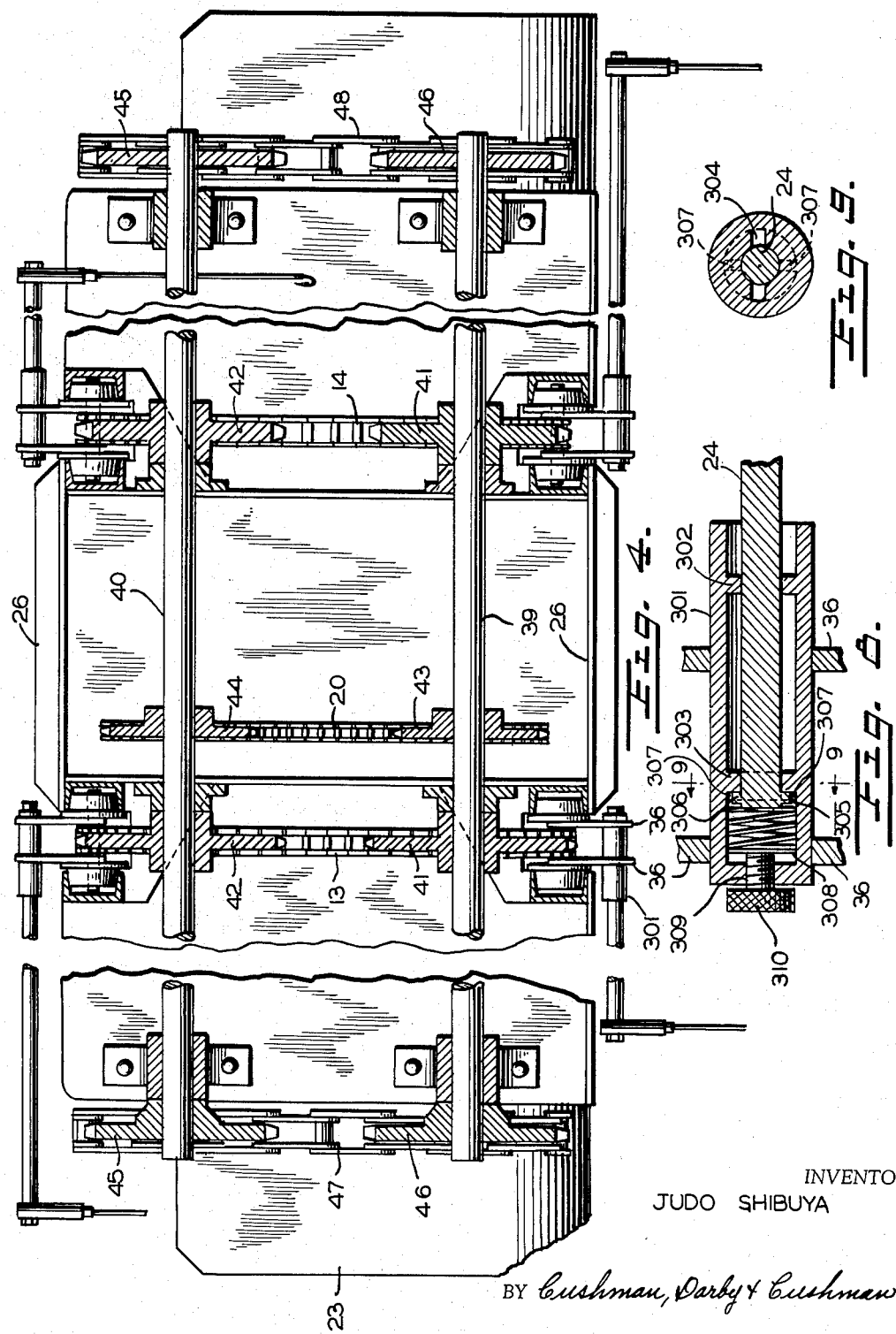

April 10, 1956   J. SHIBUYA   2,741,052
MECHANICAL FISHING APPARATUS
Filed Oct. 17, 1950   4 Sheets-Sheet 4
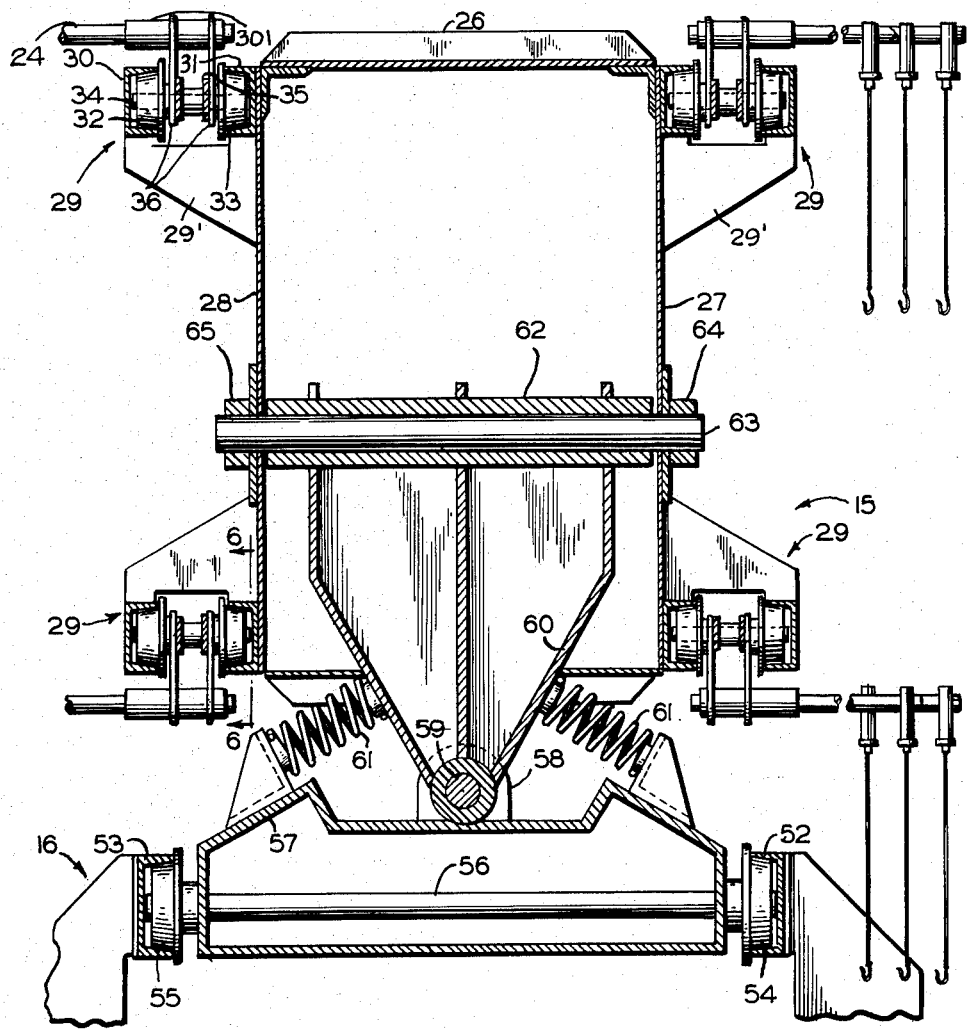
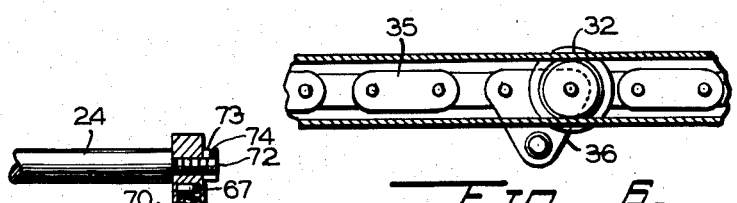
INVENTOR
JUDO SHIBUYA
BY Cushman, Darby & Cushman
ATTORNEY

United States Patent Office 2,741,052
Patented Apr. 10, 1956

2,741,052

MECHANICAL FISHING APPARATUS

Judo Shibuya, Honolulu, Territory of Hawaii

Application October 17, 1950, Serial No. 190,526

21 Claims. (Cl. 43—6.5)

This invention relates to fishing and to fishing apparatus. An example of the use of the new apparatus is catching fish which are normally caught near or at the surface of the water, such as tuna, yellowtail and albacore.

In the present generally-practiced method of commercial fishing, the crew members stand in racks, or platforms, slung over the side of the boat. Hand poles are used, and when fish are hooked, they are thrown over the shoulders of the fishermen onto the deck. In the case of a large fish, of a hundred pounds, for example, an adjacent crewman must drop his gear and help to land the fish. In the case of a two-hundred or three-hundred pound fish, several men may be needed to boat the fish.

An important object of the invention is, therefore, to provide a new fishing apparatus whereby fish of any size, after being hooked, may be brought to the deck without such manual aid.

The present limit to the distance from a hull in which a hand pole may be employed is substantially eleven feet. Moreover, it is well known that many fish will bite less readily when swimming near the hull.

Another important object is therefore to provide an apparatus whereby fishing may be carried on at distances from the hull considerably in excess of eleven feet.

During rough weather, very often the crewmen cannot fish on the racks, because of the danger of being washed overboard.

A further important object of the invention is to provide an apparatus which may be fished on in substantially all kinds of weather.

In pole fishing as described, there is, furthermore, a constant hazard that crewmen may be injured by flying hooks when a fish is slung overhead onto the deck, or injured when a shark is hooked and flung onto the deck, since it may strike a crewman or injure him when the hook is being removed.

Another object of the invention is, therefore, to eliminate this danger, since by the use of the novel apparatus herein disclosed, the hooks or fish are not flung so as to become hazards, and in the event a shark is hooked the leader may be readily uncoupled from the apparatus and the former, with the hook, removed after the shark is dead.

A further important object is to improve the effective fishing time and increase the catch by keeping a plurality of hooks in the water continuously. That is, at any given time, there will be a plurality of hooks in the water as fish are being unhooked and replacements are being made on deck.

A further object is to provide apparatus which will catch fish and then automatically disengage the fish into a boat or container.

A further object is to provide a self-releasing fish hook.

Other objects and the entire scope of the invention will be apparent during the course of the following detailed description of the invention, taken in connection with the accompanying drawings, forming a part of the disclosure, and in which drawings:

Figure 4 is a sectional view taken along line 4—4 of Figure 1 showing details of structure;

Figure 5 is a sectional view taken along line 5—5 of Figure 2;

Figure 6 is a sectional view taken along line 6—6 of Figure 3;

Figure 7 is a detailed view partly in section of a means for mounting a fishing leader;

Figure 8 is a detailed view partly in section of a rod mounting arrangement; and Figure 9 is a sectional view along line 9—9 of Figure 8.

Figure 10 is a side view in section of a self-releasing hook taken along the line 10—10 of Figure 11.

Figure 11 is a view along line 11—11 of Figure 10.

Figure 1:
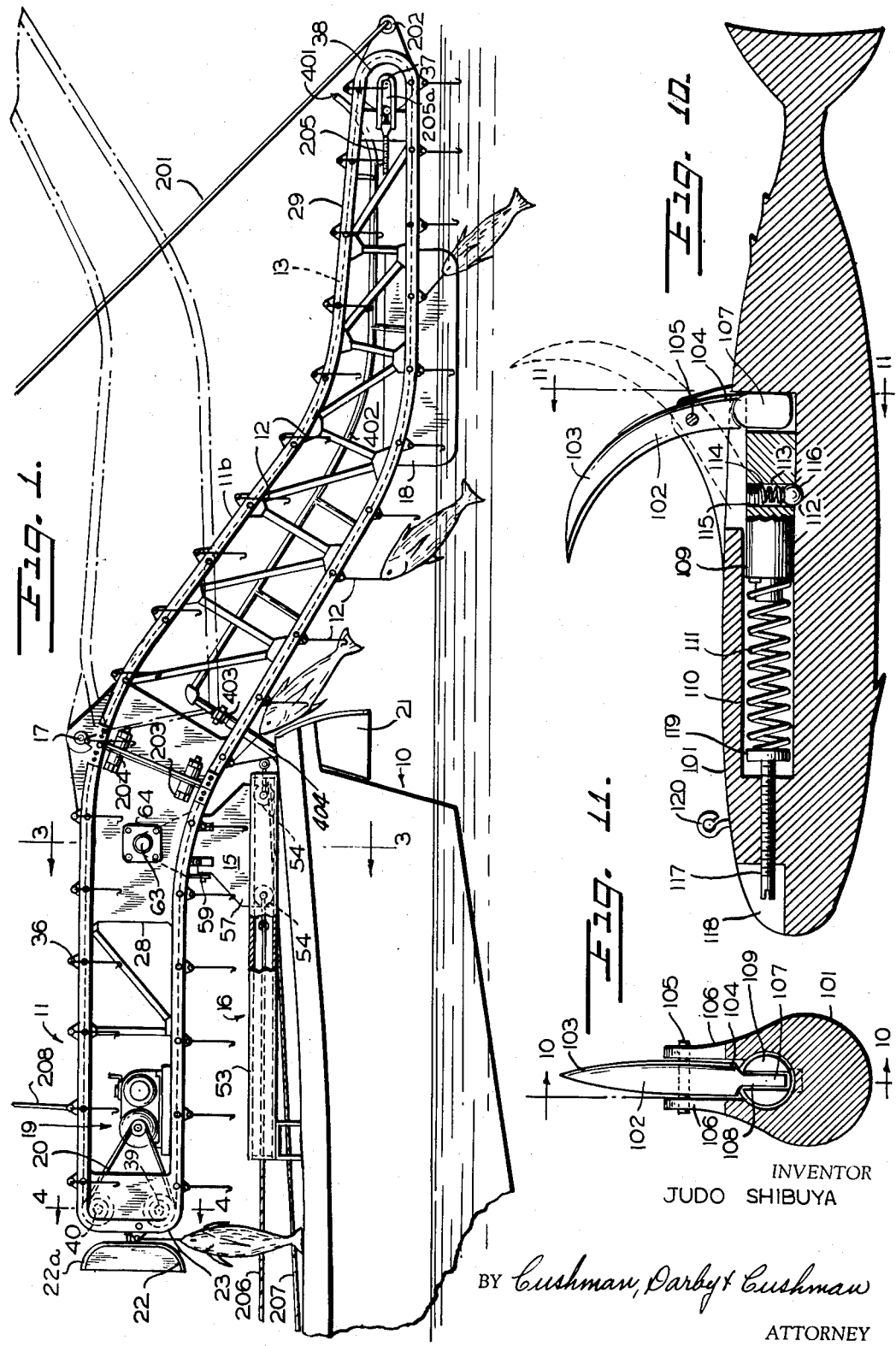
Figure 1 is a side elevation of a fishing apparatus according to my invention.
Figures 2, 3:
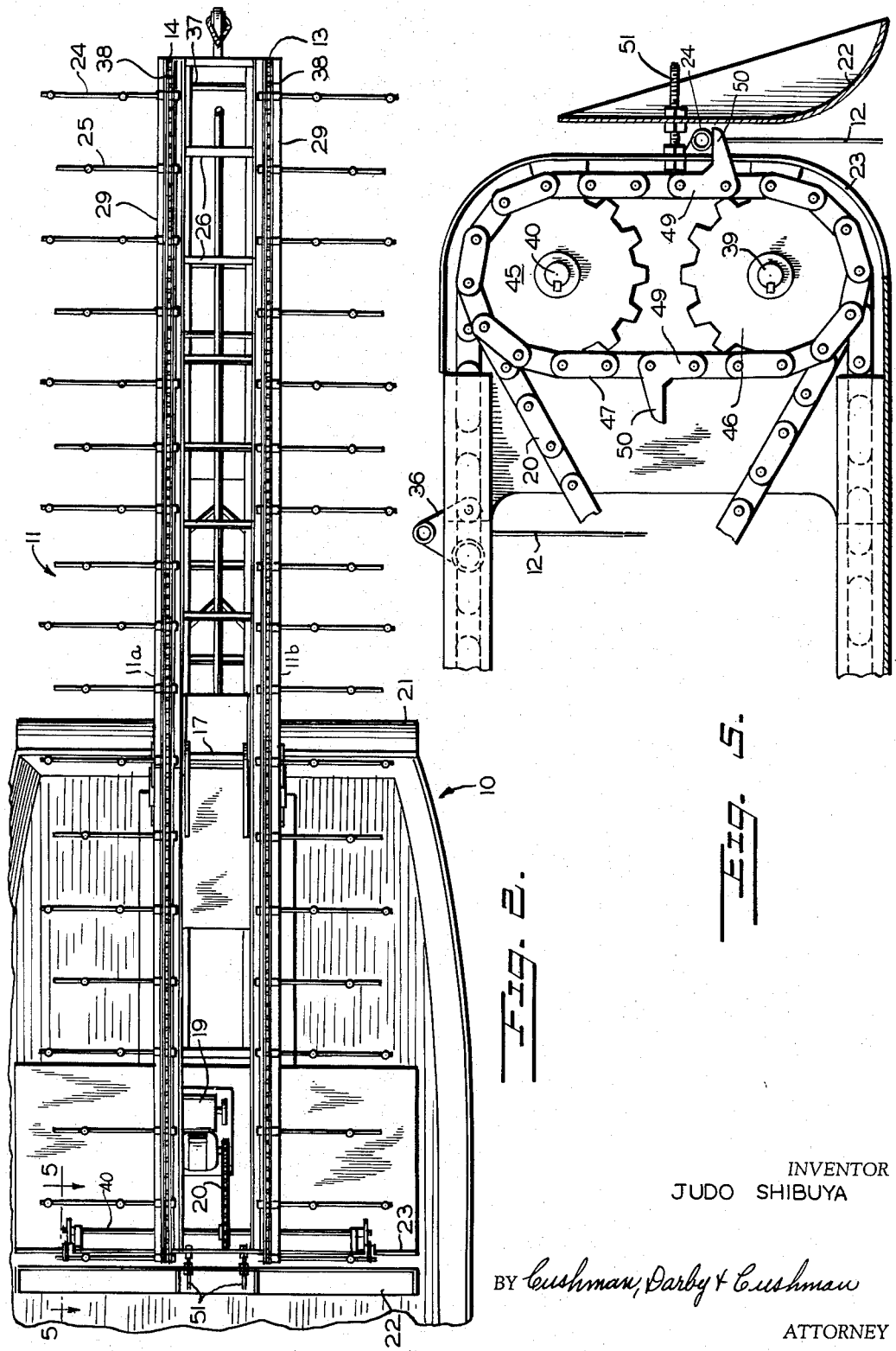
Figure 2 is a plan view of the apparatus shown in Figure 1.
Figure 3 is a sectional view along line 3—3 of Figure 1 showing details of a pivotal joint structure.

With reference to Figures 1 and 2, the numeral 10 generally indicates a fishing craft upon which is mounted a fishing conveyor structure indicated generally at 11. A plurality of fishing leaders 12 are attached to endless conveyor chains 13 and 14 on opposite sides of the conveyor structure. These chains are guided over various rotors or sprockets, which will be explained in greater detail below, in such fashion that hooks on the ends of the leaders are continuously moved from a position in the body of water to a position above the hull of the craft 10. The fish which engage themselves with the hooks while the latter are in the water are thus hoisted above the craft 10 and may be either manually or automatically released at the inboard end of the conveyor structure so that they will drop into the craft or a container therein.

The complete conveyor structure 11 is mounted for universal pivoting motion with respect to the craft 10. This pivot structure, indicated generally at 15, is further mounted on a track structure indicated generally at 16. The conveyor structure is characterized by having provision for hoisting the outboard end of the structure about a pivot point 17, upon the detachment of certain attaching means which will be described below, whereby the outboard section may assume the position indicated in the chain line in Figure 1. When the outboard section is thus hoisted, the complete structure may then be rolled inboard on the track structure 16.

A float 18 is provided on the underside of the outboard conveyor section to maintain a predetermined clearance between the water and the structure. The float in conjunction with the pivot arrangement 15 moreover permits the conveyor to follow the surface when waves are present.

A drive unit indicated generally at 19 is located on the inboard end of the conveyor structure and serves to move the conveyor chains 13 and 14 by means of drive chain 20. This drive unit may be of any suitable type such as an electric motor, steam engine, or gasoline engine.

After fish have become attached to the leaders 12, they are moved over the edge of the craft 10 by sliding over guide plate 21, which extends across the edge of the craft. When the fish arrive at the inboard end of the conveyor structure, they are pulled into a fish intercepting device, which is shown as comprising two converging releasing plates 22 and 23. These plates narrow to such a dimension that fish cannot pass through the remaining space and the hook is therefore forcibly pulled from the fish.

Self-releasing hooks may also be employed on the end of the leaders 12 to cause less destruction of the fish. A suitable self-releasing hook is part of this specification at a later point and is illustrated in Figures 10 and 11 of the drawings.

With reference to Figure 2, it may be observed that the leaders 12 are mounted on extending rods 24 and 25. Rods 24 extend a considerable distance outwardly from the conveyor chains and may carry two spaced leaders, as shown. Rods 25 are shorter than rods 24 and carry only one leader. The arrangement as illustrated provides a well distributed pattern of hooks in the water.

To prevent undue bending of the rods when the fish pass between the releasing plates 22 and 23, auxiliary movable supports are provided, as will be described in detail below.

The various features of the invention will now be described in greater detail.

Conveyor structure

The conveyor structure 11 consists of two trussed track supporting beams 11a and 11b connected together by transverse angle members 26. The construction may be of any well-known variety, such as being welded. The cross-sectional construction may be best understood with reference to Figure 3, this being a view which also shows the details of the universal pivoting mount 15. At the upper and lower edges of each of the side plates 27 and 28, there is provision for the mounting of the conveyor carrying rails indicated generally as 29. Each rail comprises an outboard C-channel 30 and an inboard C-channel 31, these being supported by brackets 29'. These channels are spaced apart and face each other. Each of the chains 13 and 14 is provided with a plurality of flanged rollers 32 and 33 which are of such diameter as to fit into the C-channels with a minimum clearance to permit longitudinal rolling movement on one or the other of the extending edges of the C-channel. A set of rollers is provided along the chains for each fishing rod 24 and 25. The rollers are spaced apart by a short shaft 34, this shaft also serving to mount chain links 35 and the rod supporting triangle-links 36.

A side view in partial section of the rollers 32, chain links 35, and triangle-links 36 is shown in Figure 6.

As previously mentioned, the C-channel tracks 29 are continuous and are curved at the ends of the conveyor structure to conform to the chain pattern dictated by guiding rotors. At the outboard end of the conveyor structure, shaft 37 supports rotors or sprockets 38 and at the inboard end of the conveyor structure, the shafts 39 and 40 support rotors 41 and 42, respectively (Fig. 4). The drive chain 20 passes over sprockets 43 and 44 of equal diameter mounted on shafts 39 and 40, respectively. The shafts 39 and 40 are accordingly driven at equal speeds.

It will be further observed from Figure 4 that shafts 39 and 40 extend outwardly beyond the conveyor chains to the auxiliary rotors 45 and 46. Auxiliary chains 47 and 48 are equipped at spaced points with links 49 (Fig. 5) which have an extending arm 50 mounted thereon or integral therewith. The chains 47 and 48 (Fig. 5) are so positioned on sprockets 45 and 46 that the arms 50 of the links 49 are synchronized to appear immediately behind the rods 24 and 25 as they move toward the inboard end of the structure and to support these rods as they move upwardly through the fish releasing plates 22 and 23. All of the shafts are mounted in suitable bearing brackets, the details of which are not important to my invention.

All of the sprockets are keyed to their respective shafts to provide the proper synchronization.

Fish releasing plate 23 is mounted on the inboard end of the structure 11, and the plate 22 is adjustably mounted on plate 23 by means of screw threaded studs 51. These will be of sufficient size or number to prevent bending when fish are drawn between the plates. Both plates may be ribbed for greater strength. Plate 23 extends over the top of shaft 40 to prevent the leaders from catching on the said shaft.

The float 18 may be of any conventional design, and may be attached to the structure 11.

Universal pivot support

The details of the universal pivot support 15 may be more fully understood from Figure 3. The complete pivot is mounted for rolling movement in C-rails 52 and 53. Rollers 54 and 55, of which there are two on each rail (Fig. 1), are separated by shafts 56. A pivot base 57 is supported by the shafts 56 and is provided with bearings 58 for receiving a fore-and-aft shaft 59. Mounted on shaft 59 is an intermediate pivot support 60. Opposed springs 61 extend between abutments on pivot base 57 and the intermediate support 60 and serve to normally retain the support 60 in substantially vertical relation to the base 57. A bearing housing 62 is attached to the intermediate support 60 and runs transverse to the axis of bearings 58. A shaft 63 extends through the bearing 62 and into the supporting lugs 64 and 65 which are located in the side members 27 and 28, respectively, of the conveyor structure.

From the structure thus described, it is apparent that the outboard end of the structure 11 will be enabled to follow the surface of the water by pivoting motion about shaft 63, and transverse rocking will be permitted about shaft 59.

Details of leader mounting

To firmly seat a hook in the mouth of a fish, it is essential that the hook be permitted to move a short distance when the fish bites. I provide a resilient connection, the details of which are shown in Figure 7. This illustration is of a leader connected to the outermost end of rod 24. The leader 12 is connected to a plunger 66 which has a widened top 67. This plunger is supported in a body 68 which has a passage 69 to receive the plunger head 67 and a spring 70. The lower end of the space 69 may be closed by a retaining shoulder 71 after the plunger and spring have been inserted, the member 71 serving as a support against which the spring may act at its lower end. The supporting body 67 is mounted on the rod 24 by means of threaded stem 72 and retaining nut 73. A set screw 74 may be inserted through the nut 73 to lock the nut at such position that the body 67 will be freely movable about the axis of the rod 24. The plunger 66 together with its top 67 is preferably cylindrical so that the hook 12 may freely twist about its axis. When the hook is pulled downwardly, the spring 70 will compress to provide the necessary "spring."

In the case of the rods 24, the innermost leader 12 is mounted in the same manner except that in place of the nut 73 an extension may be provided to extend to the outermost leader.

Hoisting

To hoist the conveyor structure inboard of the craft when it is not in use, a guy line 201 is attached to an eye 202 at the outboard end of the structure 11. Connecting bolts 203 and 204 are then disconnected and a chain slack take-up device 205, bearing against a sliding block 205a, is backed off. The device 205 may be of any obvious design. The guy line 201 may then be taken in with the result that the outboard end of the structure 11 pivots about the point 17 so that the outboard structure may be raised into the chain line position shown in Figure 1. With the outboard structure in the chain line position, the lines 206 and 207 may be operated to roll the pivot structure 15 along the rails 52 and 53 to an inboard position. When the hoisting operation is undertaken, the inboard end of structure 11 may be supported by a line 208 to prevent its striking the deck of craft 10.

Rod sockets

Figures 8 and 9 illustrate a socket arrangement for the rods 24 and 25 which provides a means of quickly replacing rods which may become damaged. A supporting sleeve 301 is attached to the triangular links 36 of the conveyor chains and the rods 24 and 25 are adapted to be inserted into the sleeve 301 in the following manner: The sleeve 301 is made hollow and has bearing surface members 302 and 303. These bearing surface members are each milled in a transverse section 304 (Figure 9) to pass opposing lugs 305 and 306 attached to the end of the rods 24 and 25. These lugs may be integral or formed by drilling a transverse hole through the rods 24 and 25 and inserting therein a pin which will extend the necessary distance from the sides of the rod. The inner side of the bearing surface 303 is further provided with arcuate seats 307 (Figure 9) to receive the lugs 305 and 306 when the latter are turned substantially 90 degrees from the inserting position. A spring 308 is provided to bear against the end of the rod 24 to retain the lugs 305 and 306 in the seats 307. The compression of the spring 308 may be adjusted by screw means 309 having a knurled knob 310 at the outer end thereof.

Releasable hooks

As previously mentioned, the ordinary fish hooks on the ends of the leader 12 may be replaced by a self-releasing hook. The details of my self-releasing hook are shown in Figures 10 and 11 of the drawings, wherein a supporting body 101 may have the external shape of a small fish, and may be plain or be of the shape of any other type of bait which is ordinarily used. A hook 102 having an outer end 103 and an inner end 104 is pivotally mounted on the body 101 at pivot pin 105. The pivot pin is supported by extending ears 106 which may be formed integral with the body 101. The inner end 104 of the hook 102 has a reduced section 107 adapted to fit into a slot 108 in the end of a plunger member 109. The plunger 109 slides in a longitudinal passage 110 in the body 101 and is resiliently pressed against the end 104 of the hook by means of spring 111.

From the structure thus far described, it will be apparent that the hook 102 will be normally retained in a position shown in Figure 10 but when sufficient force is supplied to the outer end of hook 103 in a direction to the right as viewed in Figure 10, the hook will rotate clockwise about the pivot 105 and in so doing will slide the plunger 109 to the left and compress the spring 111. A ball 112 is provided for sliding movement in transverse hole 113 extending through the plunger 109. A spring 114 is positioned in the hole 113 and bears against the ball 112 at one of its ends and against a threaded plug 115 at the other end. A detent 116 of less depth than the radius of ball 112 is provided in the body 101 at such point that the ball 112 will be seated in the detent 116 when the hook is in its non-released position. In operation, a somewhat greater force will be required to displace the ball 112 out of the detent 116 than will be required to move the plunger 109 after the ball is unseated. This action provides what may be termed a yielding force once the movement of the hook in the releasing direction is initiated.

The initial compression of the spring 111 may be adjusted by means of set screw 117 which extends parallel to the general axis of the body 101 and is accessible by virtue of the opening 118 at the forward end of the body 101. Set screw 117 is terminated at its inner end with a flat head 119 which serves as the seat for the spring 111. The complete device may be attached to leaders 12 by means of eye 120.

Spray attachment

In fishing with the above or any apparatus, it has been discovered that improved results are obtained if a spray of water is played on the surface so that the fish cannot see through to the apparatus.

To perform the above method, I provide on the outboard end of structure 11 a spray nozzle 401, which is connected to a pipe 402 extending to a joint 403 near the pivot joint 15. A flexible hose 404 then connects pipe 402 to a pumping system within the craft 10. The flexible hose permits the pumps to remain connected to the spray in any position of the pivot 15 along the rail arrangement 16, and also permits pivoting of the structure 11 due to wave motion.

Operation

The operation of the embodiment illustrated in Figure 1 is as follows: the outward end of the conveyor structure is maintained in proximity to the water level by use of suitable float 18. The motor means 19 drives the conveyer chain clockwise as viewed in Figure 1 and fish caught on the hooks move inboard over guide 21 and upwardly between plates 22 and 23. At a predetermined point determined by the relative spacing of plates 22 and 23 and the size of the fish, the hook is withdrawn from the fish and the latter falls into the hold of the boat. Whenever the hook is of a variety as illustrated in Figures 10 and 11, the hook will function upon the restraint of the fish causing predetermined force on the movable parts of the hook. However, when a solid hook is used, the forces involved will tear the hook from the fish. In either case the fish is automatically removed from the conveyor and leaders by the action of plates 22 and 23. During the fishing operation a spray of water may be played on the surface of the main body of water so as to prevent the fish from seeing the conveyor structure. Whenever the apparatus is not in use, the bolts 203 may be removed, and the outboard end of the structure elevated by means of line 201. Additionally, the entire structure may be rolled inboard of the boat along the track structure 16.

It will be apparent from the foregoing detailed description that my invention broadly contemplates a conveyor which may be operated in either direction. It will be observed that the conveyor may operate so that the leaders move outboard while in the lower or immersed position and may move inboard along the top of the conveyor structure. In such an arrangement, the releasing plates could be dispensed with or suitable plates arranged to operate in the opposite direction from those shown in the drawings, that is to say, the releasing plate 22 may have its upper surface curved to extend in an inboard direction as at 22a.

The foregoing description of my complete invention and the detailed part thereof have been made detailed only for the purpose of providing a clear understanding of my invention. I intend that the true scope of my invention is to be determined by the appended claims.

It will be understood that my arrangement for releasing fish by attempting to draw them through a constricted space may be used with any fishing apparatus.

Unless otherwise specified, "leader" in the claims is intended to define a fishing line together with any variety of hook or other device employed to catch fish.

I claim:

1. In fishing apparatus, a structure having outboard and inboard ends, means movable along the structure between the said outboard and inboard ends, a fishing leader attached to the movable means, driving means to move the movable means along the structure, supporting means arranged to retain the outboard end of the structure in proximity to a body of water so that the leader extends into the water when adjacent the said outboard end, and means comprising retarding means for intercepting and automatically releasing fish from the leader adjacent the said inboard end.

2. In fishing apparatus, a structure having outboard and inboard ends, means movable along the structure between the said outboard and inboard ends, a fishing leader attached to the movable means, driving means to move the movable means along the structure, supporting means arranged to retain the outboard end of the structure in proximity to a body of water so that the leader extends into the water when adjacent the said outboard end, and automatic means for intercepting and releasing fish attached to the leader when the latter is moved to a position adjacent the inboard end of the structure.

3. In fishing apparatus, a structure having outboard and inboard ends, an endless flexible member extending along the length of the structure, fishing leaders attached to the endless member at spaced points along the length thereof, means for driving the endless member so that the leaders are repeatedly moved from one end of the structure to the other end and return, means for mounting the structure so that the leaders extend into a body of water at least when the said leaders are adjacent the outboard end of the structure, whereby fish becoming attached to the leaders are carried to the inboard end of the structure, and mechanical means for intercepting and detaching fish from the leaders adjacent the said inboard end.

4. In fishing apparatus, a structure having outboard and inboard ends, an endless flexible member extending along the length of the structure, fishing leaders attached to the endless member at spaced points along the length thereof, means for driving the endless member so that the leaders repeatedly move from one end of the structure to the other end and return, means for mounting the structure so that the leaders extend into a body of water at least when the said leaders are adjacent the outboard end of the structure, whereby fish becoming attached to the leaders are carried to the inboard end of the structure, and fish releasing means adjacent the inboard end of the structure for automatically releasing fish from the leaders when the latter are adjacent the said inboard end, the releasing means comprising means to forcibly retain fish so that the leaders are removed therefrom.

5. In fishing apparatus for attachment to a carrier to extend over a body of water, an elongated support having an outboard end and an inboard end, rotors at each end of the support, a flexible endless member trained over the said rotors to rotate therewith, fishing leaders, means securing said leaders at one end and in spaced-apart relationship to the said endless member, a lure carried by the free end of each leader, means to drive the endless member in a predetermined direction over the rotors, means to attach said inboard end to the carrier to project outwardly therefrom over said body of water, means to suspend said support over the body of water with some of said lures within the body of water, and fish intercepting means through which the leaders pass for automatically detaching fish therefrom at the inboard end.

6. In combination with a boat floating in a body of water, an elongated support having an outboard end and an inboard end, a plurality of spaced apart fishing leaders, a lure for each leader, means carried by said support and to which the leaders are attached to convey said leaders while extending into the water for a predetermined distance along the support, said conveying means also serving to further move the leaders between the inboard and outboard ends while out of the water, and fish releasing means for removing fish from the lures into the boat, said releasing means comprising means to intercept fish so that the lures move with respect thereto.

7. In fishing apparatus, an elongated conveyor structure comprising inboard and outboard ends, rails on each side of the said structure extending along the periphery of the said structure, rollers adapted for movement along said rail, endless conveyor chains mounted on said rollers, sprockets at each end of the structure for guiding the chains around the ends of the structure, drive means for imparting unidirectional movement to the chains along the rails, fishing rods extending outwardly from the chains at spaced intervals along the length thereof, fishing leaders depending from the rods, a resilient connection between each leader and each rod, self-releasing hooks at the free end of each of the leaders, converging fish releasing plates at the inboard end of the structure through which the leaders and hooks are drawn, a universal pivot support attached to the structure and adapted to support the structure on a fishing craft so that the outboard end of the structure is positioned adjacent a body of water, float means attached to the outboard end of the structure to maintain a predetermined clearance of the outboard end above the water, spring means for retaining the structure in a substantially vertical plane relative to the craft, means for pivoting the outboard end of the structure relative to the inboard end to permit hoisting the outboard end away from the water, and roller means for moving the entire structure inboard of the craft when the outboard end is hoisted.

8. In fishing apparatus, a structure adapted to be positioned adjacent a body of water, a flexible endless member trained over the structure, means to move the endless member in a predetermined direction, fishing leaders attached to the member at spaced points along the length thereof, the said leaders being adapted to extend into the water during at least a portion of the cyclic travel of the member during which fish may become attached to the leaders, and means comprising an interceptor member to impede the movement of the fish to disengage the fish from the leaders at a predetermined position along the path of travel of the endless member.

9. A fishing apparatus comprising, a conveyor structure, a conveyor member mounted for movement along said structure, one end of the structure being adapted to be positioned in proximity to a body of water, a fishing leader provided with a hook, said leader being attached to the conveyor member and being of such length to extend into the water when the conveyor member positions the hook adjacent the said one end of the conveyor structure, the other end of the conveyor structure being located adjacent to a container, and means to move the conveyor member to move the leader from one end of the conveyor structure to the other, whereby fish which become attached to the hook while the latter is in the water may be moved to the said other end of the conveyor for release into the said container, and means comprising a pair of converging plates for automatically removing fish from the leader.

10. A fishing device comprising a conveyor structure adapted to extend over the edge of a support and into proximity to the surface of a body of water at its outboard end, an endless conveyor member adapted for movement along the conveyor structure, means for attaching a plurality of fishing hooks to the conveyor member from spaced points along the length thereof, a container located beneath the end of the conveyor structure opposite the said end which is in proximity to the water, means to move the conveyor member on the conveyor structure so that the fishing hooks are sequentially moved from a position within the body of water to a position over the said container, and means for automatically releasing fish caught on the hooks, said releasing means comprising intercepting means and located at a point where the conveyor passes above the container, whereby released fish are automatically placed in the container.

11. The apparatus in claim 10 wherein the means for releasing the fish comprises converging plates between which the leaders are freely moved but which so converge that the movement of the fish is impeded.

12. The apparatus as in claim 11 wherein the fish releasing means further comprises a self-releasing fish hook which is adapted to release fish carried thereon when the hook is moved between the converging plates.

13. The apparatus in claim 10 wherein the conveyor structure is mounted on the support by means including a universally mounted pivot means.

14. The structure as in claim 10 and including a float attached to the conveyor structure and adapted to maintain a predetermined clearance between the outboard end of the conveyor structure and the surface of the water.

15. The apparatus as in claim 10 including a hinge in the conveyor structure located adjacent the support, whereby the conveyor structure is adapted for hoisting movement.

16. In fishing apparatus, an elongated conveyor structure comprising inboard and outboard ends, rails on each side of the structure extending along the periphery of the said structure, endless conveyor chains, rollers adapted for movement on the said rails, said chains being mounted on said rollers, sprockets at each end of the structure for guiding the chains around the ends of the structure along the rails, drive means for imparting unidirectional movement to the chains along the rails, fishing rods extending outwardly from the chains at spaced intervals along the length thereof, fishing leaders depending from the rods, a universal pivot support attached to the structure and adapted to support the structure on a fishing craft so that the outboard end of the structure is positioned adjacent a body of water, float means attached to the outboard end of the structure to maintain a predetermined clearance of the outboard end above the water, and spring means for retaining the structure in a substantially vertical plane relative to the craft, the predetermined clearance of the said outboard end above the water permitting the fishing leaders to be submerged when adjacent the outboard end.

17. Apparatus as in claim 1 in which the inboard end of the structure is mounted on a fishing craft.

18. Apparatus as in claim 17 in which the structure is pivotally mounted on the fishing craft.

19. Apparatus as in claim 17 in which the structure is universally mounted on the fishing craft.

20. Apparatus as in claim 17 in which the mounting means comprises resilient means for normally maintaining the structure in a predetermined position with respect to the fishing craft.

21. Apparatus as in claim 1 which includes a pole extending outwardly from the movable means, said leader being attached to the movable means by said pole, a lure attached to the leader, and a resilient connection between the lure and the pole.

References Cited in the file of this patent

UNITED STATES PATENTS

| Number | Name | Date |
|---|---|---|
| 578,248 | Layne | Mar. 2, 1897 |
| 683,750 | Guindon | Oct. 1, 1901 |
| 699,397 | Lacey | May 6, 1902 |
| 801,523 | Hinchman et al. | Oct. 10, 1905 |
| 1,088,449 | Reppa | Feb. 24, 1914 |
| 1,103,392 | Biro | July 14, 1914 |
| 1,250,053 | Tukey | Dec. 11, 1917 |
| 1,340,677 | Whitehead | May 18, 1920 |
| 1,510,580 | Bryen | Oct. 7, 1924 |
| 1,745,251 | Enright | Jan. 28, 1930 |
| 1,814,026 | Draeger | July 14, 1931 |
| 2,433,858 | Maxson | Jan. 6, 1948 |
| 2,477,790 | Farr et al. | Aug. 2, 1949 |
| 2,488,451 | Ursich | Nov. 15, 1949 |
| 2,501,210 | Cretin | Mar. 21, 1950 |

FOREIGN PATENTS

| Number | Country | Date |
|---|---|---|
| 71,712 | Norway | Feb. 17, 1947 |